United States Patent [19]

Lemaresquier

[11] 3,752,297
[45] Aug. 14, 1973

[54] ROLLER CONVEYOR HAVING AN ENDLESS DRIVING ARRANGEMENT

[76] Inventor: Pierre Francois Lemaresquier, 9, avenue de L'Observatorie, Paris (5'eme), France

[22] Filed: Dec. 11, 1970

[21] Appl. No.: 97,155

[30] Foreign Application Priority Data
Dec. 17, 1969 France .............................. 6943689

[52] U.S. Cl. .............................................. 198/127 R
[51] Int. Cl. ............................................. B65g 13/02
[58] Field of Search .................. 198/127; 193/35 SS

[56] References Cited
UNITED STATES PATENTS
3,127,003 3/1964 Goepper ........................ 198/127 R
3,170,562 2/1965 Eyster .............................. 198/127 R
3,243,029 3/1966 Oliver ............................... 193/35 SS
3,040,872 6/1962 Hohl ................................. 198/127 R
3,108,671 10/1963 Fuka ...................................... 193/40
3,621,982 11/1971 Fleischauer ..................... 198/127 R Primary Examiner—Richard E. Aegerter
Attorney—Spencer & Kaye

[57] ABSTRACT

A roller conveyor having a drive arrangement of the endless type which is capable of driving the rollers intermittently.

1 Claim, 6 Drawing Figures

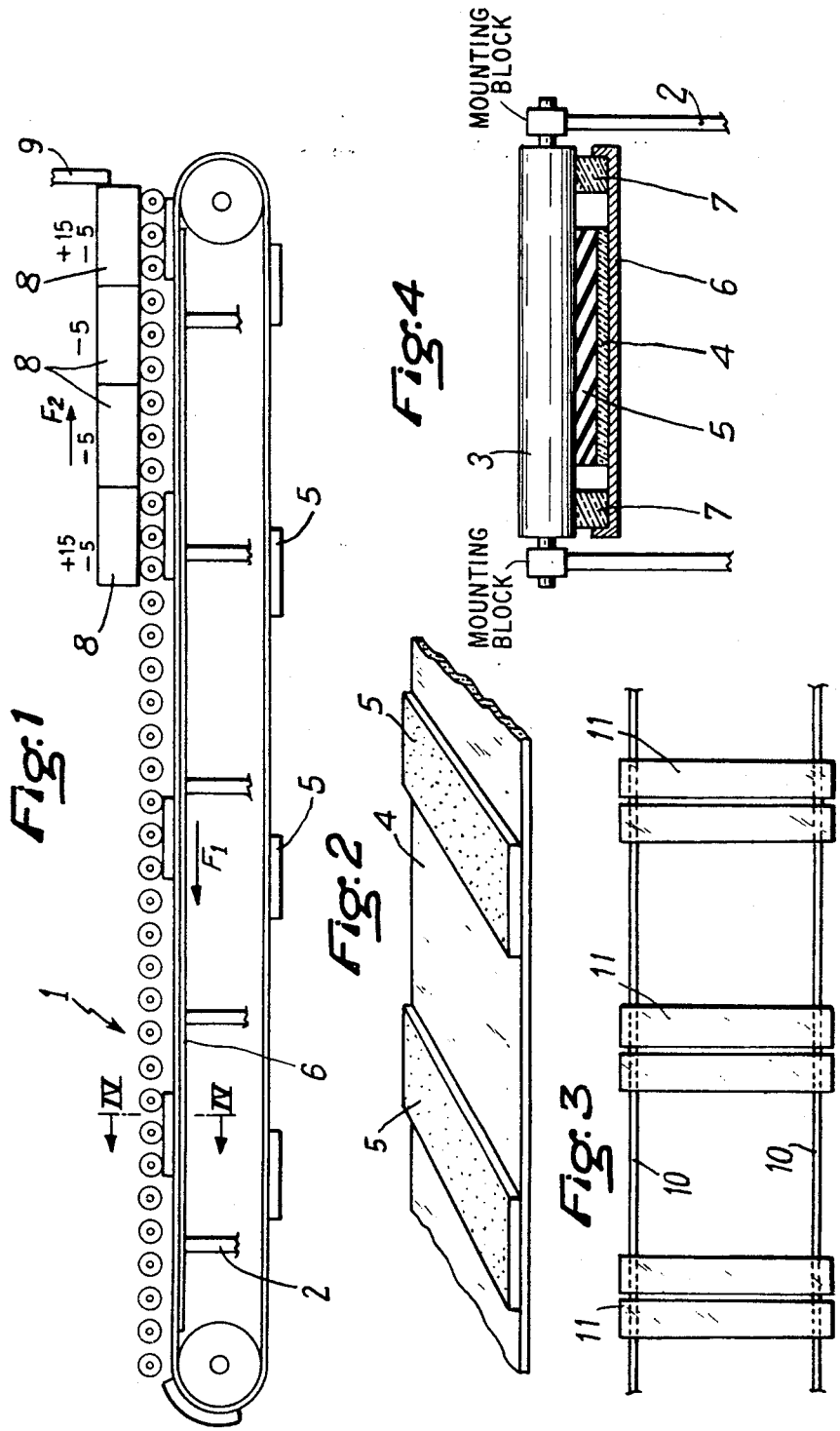
INVENTOR.
Pierre François Lemaresquier

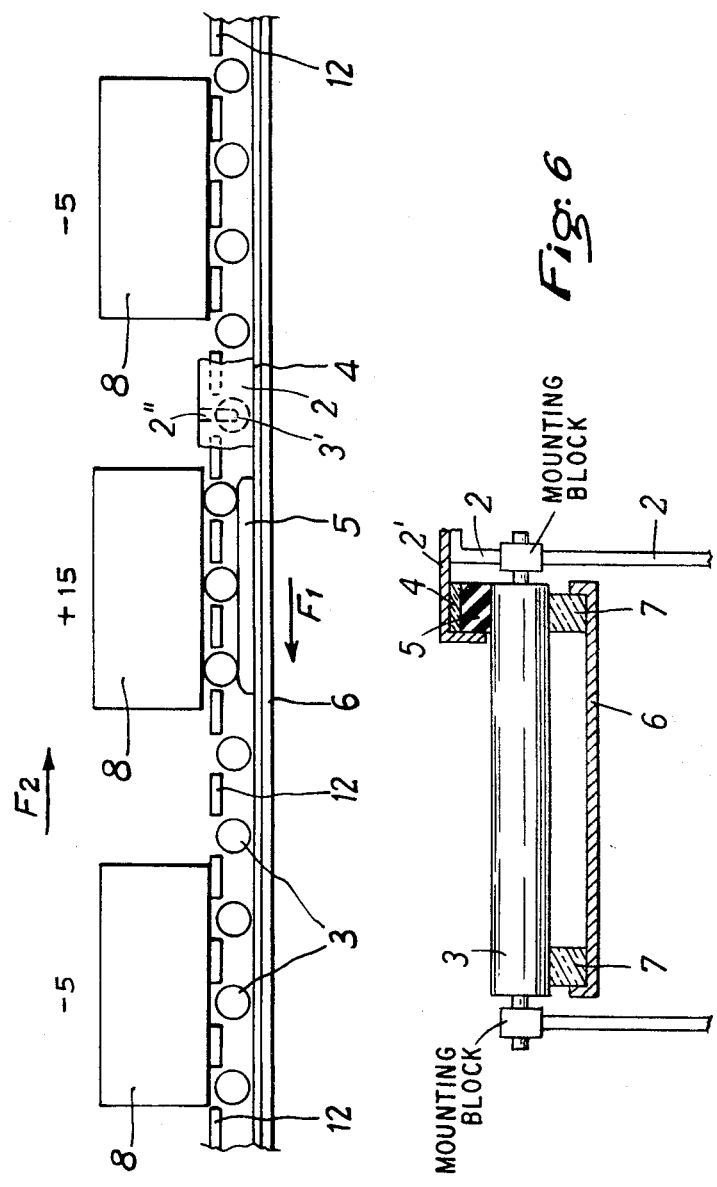

ROLLER CONVEYOR HAVING AN ENDLESS DRIVING ARRANGEMENT

BACKGROUND OF THE INVENTION

This invention relates to a roller conveyor, in which the rollers can be driven by a driving arrangement of the endless type.

Conveyors of this kind are already known in which an endless belt makes friction contact against the lower surface or against a part of the upper surface of the rollers in order to cause them to turn. If the packages moved by the rollers' rotation encounter an obstacle that checks them in their movement, they accumulate one against another. In this case, the belt continues to move while scrubbing against the rollers which remain stationary. The scrubbing indeed takes place, as is desirable, not between the rollers and the packages which could be damaged by it, but between the belt and the rollers.

However, although immobilized, the rollers are continuously loaded by the belt and seek to push the packages forward; the forces thus exerted upon each of these latter accumulates in such a manner that the first packages in the line are subjected to considerable compression forces which can attain values of many hundreds of kilograms.

To eliminate this shortcoming it has been suggested that rollers termed "declutchable" should be employed; that is to say, equipped with a torque limiting device which cuts out the roller drive when the resistant torque exceeds a certain value. These rollers have the defect of being expensive; in addition, they need individual adjustment which is not always maintained over a period of time and which has to be checked and corrected for each individual roller.

SUMMARY OF THE INVENTION

The main object of the invention is to provide a roller conveyor with an endless type of drive in which the immobilized and accumulated packages only have to sustain very slight compression forces, or even none at all.

Another aim of the invention is to be able easily to control the value of the compression forces which the packages sustain when they are stopped and accumulated.

A secondary objective of the invention is to attain this result with the aid of simple means, less costly than the rollers with a declutching mechanism.

According to the invention a roller conveyor comprises a frame, a series of rollers rotatably mounted in said frame, and an endless drive means having one run arranged to be capable of driving said rollers, said drive means including a number of spaced-apart elements which are capable of coming successively into driving engagement with said rollers to drive the rollers intermittently.

According to one advantageous aspect of the invention, a braking device is applied against the face of each roller in order to reduce its freedom to rotate.

In a preferred form of embodiment of the invention, a sheet of steel is supported underneath the roller assembly, parallel to their lower faces, two braking bands are arranged along the longitudinal edges of this sheet, these bands applying friction to each of the rollers, the active run of a belt circulates between the steel sheet and the rollers, in the longitudinal direction between the braking bands, the thickness of this belt at the localities of the raised zones being slightly greater than the thickness of the braking bands.

BRIEF DESCRIPTION OF THE DRAWINGS

The invention will now be described more particularly with reference to the accompanying drawing, in which:

FIG. 1 is a schematic representation of an embodiment of a roller conveyor in accordance with the invention;

FIG. 2 is a perspective view of a part of an endless driving arrangement for the conveyor;

FIG. 3 is a view from above of another driving arrangement which may be used with the conveyor:

FIG. 4 is a transverse section taken on the line IV — IV in FIG. 1:

FIG. 5 is a schematic elevational view of another embodiment of conveyor in accordance with the invention.

FIG. 6 is a transverse sectional view like FIG. 4 illustrating the drive means disposed above the rollers 3.

DESCRIPTION OF THE PREFERRED EMBODIMENTS

The conveyor designated by the general reference 1 in FIG. 1 includes a frame 2, shown in part, and a set of parallel rollers 3. Beneath the lower surface of these rollers, there is arranged an endless drive arrangement in the form of an endless belt 4 which is taken over two end pulleys, at least one of which is driven by a motor to move the belt in the direction of the arrow $F_1$. The outer surface of the belt 4 has a succession of raised zones (elements) 5, spaced out one from another.

The upper run of the belt 4 moving in the direction $F_1$ is arranged to engage with the lower surfaces of the rollers 3. For this purpose, the frame 2 also supports, by means not shown, an extended steel sheet 6 (see FIG. 4) having raised edges. The sheet 6 is supported beneath the rollers and the upper run of the belt 4 runs along this sheet, the upper surface of the raised zones 5 being squeezed into driving engagement with the lower surfaces of the rollers 3.

It will be noted that the vertical positioning of the sheet 6 may be made adjustable and that this sheet can be replaced by other equivalent means (presser pads with adjustable springs, lever with counter-weights, etc.). It would also be possible to locate the belt 4 above the rollers 3, the active (driving) run then being the lower run, which would be squeezed against a part of the upper surfaces of the rollers 3.

The rollers 3 are mounted free to rotate on the frame 2 but, by reason of imperfection in production each roller will offer some resistance to rotation. If the value of this innate resistance torque is not sufficient, braking for all the rollers may be provided by means of a braking device. This device can be constituted, for example, by friction bands 7 which are arranged along the longitudinal edges of the steel sheet 6 and which are squeezed against the lower surfaces of the rollers 3. The adjustment of the position of the sheet 6, or of any equivalent component which may replace it, makes it possible to adjust the braking effect exerted upon the rollers by the bands 7.

When the active run of the belt 4 circulates in the direction $F_1$ (FIG. 1), the rollers are only caused to rotate intermittently by engagement with successive raised zones 5. At the same time, packages 8 carried by the rollers are moved intermittently in the direction $F_2$. The rollers turn on the passage of the raised zones 5 because the action is such that the driving torque imposed upon these rollers by the belt 4 is greater than their innate resistance torque or than the braking torque which is applied to them by the braking device, e.g. the bands 7.

For example, the effect of the raised zones 5 can be to apply to each package 8, through the intermediary of the rollers 3, a force of 15 kg in the direction $F_2$, but as the bands 7 brake the rollers with, for example, an effect equivalent to a force of 5 kg, each package 8 is finally moved by a net force of 10 kg in the direction $F_2$.

If any form of obstacle, symbolized by an abutment stop 9, stops the packages, these will accumulate one against another as can be seen from FIG. 1. Of the four packages shown, only two, the first and the last, are simultaneously subjected to an advancing force. From the effect of the spacing of the raised zones 5 the compressive force is already greatly reduced.

In addition, as the rollers are braked, the net progressing force, 10 kg, of the last package is absorbed by the resistance to the progression (twice 5 kg) of the two following packages. Thus the first package of the line is not subjected to any compression by the following packages.

In this example, each group of three successive packages transmits no force to the packages preceding the group.

Of course, the figures above are only quoted by way of an example. In the same way, the number and the size of the raised zones 5 will depend upon the intended use of the conveyor. For a delivery rate of the rollers ranging from 15 to 30 meters/minute (speed of the packages carried) and a total conveyor length of 30 m, it is possible to give each raised zone a length of about 1 meter. The speed of the belt and the spacing of the raised zones is fixed in such a way that each package will be moved several times per minute, for example ten times.

The height of the raised zones 5 in relation to the belt can be about 5 mm. To avoid any difficulty when the belt curves in order to pass around the end pulleys, the raised zones are given a diagonal inclination as shown in FIG. 2.

The belt 4 can be replaced by an equivalent component, for example two traction elements such as chains or cables 10 linked transversely by a succession of transverse slats 11 (FIG. 3).

It is also possible to reduce the power dissipated by the friction by giving the raised zones 5 such a thickness that at the moment when they pass beneath a roller 3 they cause a greater spacing between this roller and the sheet 6. In this manner the friction produced by the brake bands 7 is lessened during such passage. The net progression force imposed upon the package in the direction $F_2$ is higher and that force is no more entirely neutralized by the resistance to advancement of the two preceding immobilized packages. Nevertheless, the compressive force applied to the first package of the line is considerably reduced compared to what it would be with a conveyor of the traditional type.

Referring now to FIG. 5, in this embodiment of the invention the rollers 3 are mounted on the frame 2 so as to be capable, simultaneously, of being rotated and being moved in a vertical direction. In addition, these rollers are spaced further apart than in the previous embodiment and transverse plates 12 are fixed to the frame between adjacent rollers. These plates can be disposed between adjacent rollers as shown in FIG. 5 or between groups of two or more rollers.

In order to achieve the simultaneous rotation and vertical displacement of the rollers 3, the rollers may be mounted, for example, with their end pins 3' extending into vertical slots 2'' of the frame 2.

It should be understood, however, that the rollers 3 would still achieve their simultaneous motion in other ways. It is only necessary to confine the rollers 3 between successive plates 12 so that their longitudinal motion is limited to the spacing of the plates 12. The transverse motion of the rollers 3 is, of course, confined by the frame 2.

In all cases, when the rollers are in their lowest position, their upper surfaces are located below the upper surfaces of the plates 12 and the packages then remain resting on the plates 12.

The belt 4 is provided with several raised zones 5. These raise up the rollers 3 as they pass and cause them to turn. When the rollers are raised, their upper surfaces rise above the plates 12. The packages are then lifted up and displaced by the rollers without friction upon the plates 12. The surface of these latter can be covered with a friction material (friction lining) which ensures a safe and given braking effect upon the packages which are resting on them. For example, it is possible to provide a braking equivalent to the effect of a force of 5 kg as in the preceding example. But in the present case the progression force does not suffer any deduction; so it should therefore be a net value of 15 kg.

If an accumulation of packages occurs, only the packages raised up by the raised zones on their passage under the rollers are drawn along; the others, which rest on the plates, offer a resistance to the progression which neutralizes the advancement force and avoids the crushing of the packages which have been stopped.

Referring now to FIG. 6, the drive means is shown mounted for engaging the upper surface of the rollers 3. For simplicity, the drive means has only been shown on the right side of the roller. It should be understood, however, that a similar arrangement may be mounted on the left side as well, or on only the right or left side exclusively, if desired. A steel angle plate 2' is mounted to the frame 2 and serves as a guide for the belt 4 on which the raised zones 5 are spaced.

As mentioned above, an adjustment of the braking effect exerted upon the packages is possible. This adjustment can be effected remotely in such a manner that the braking effect is nil when the conveyor must operate with a large delivery capacity without risk of accumulation and so that it takes a high value when the packages begin to accumulate.

I claim:

1. In a driven roller conveyor of the type for accumulating packages comprising a frame, a series of rollers rotatably mounted on the frame, drive means having spaced-apart raised portions which successively contact various ones of the rollers, with a surface of the portions arranged to cooperate with at least a portion of the surface of the rollers, and a motor coupled to the drive means, the improvement comprising a braking device mounted on the frame and applied against the surface of at least certain of the rollers, wherein said braking device comprises a sheet disposed under said rollers and extending parallel to the lower surface of said rollers, and two braking bands arranged along the longitudinal edges of said sheet, said bands being arranged to engage frictionally against each of said rollers, and wherein said drive means includes an endless means which contains the raised portions and which is movable between said sheet, said rollers and said braking bands, the thickness of said drive means being slightly greater in the region of the raised portions then the thickness of said braking band.

* * * * *